May 1, 1956      D. H. McCORKLE      2,743,574

TWO-WAY FAST ACTING BIMETAL CONTROL ELEMENT

Filed April 13, 1953

INVENTOR.
DONALD H. McCORKLE, SR.

BY Naylor and Lassagne

ATTORNEYS

United States Patent Office 2,743,574
Patented May 1, 1956

2,743,574
TWO-WAY FAST ACTING BIMETAL CONTROL ELEMENT

Donald H. McCorkle, Berkeley, Calif., assignor to D. H. McCorkle Company, Berkeley Calif., a corporation of California Application April 13, 1953, Serial No. 348,275

1 Claim. (Cl. 60—23)

This invention relates to heat motors, and more particularly to a novel combination of elements comprising a two-way fast acting bimetal type of heat motor.

The essential object of the invention is to provide a bimetal type of heat motor which is fast acting in both directions of movement.

In summary, the bimetal heat motor of the invention comprises a pair of attached bimetal strips so disposed as to be oppositely acting with respect to each other under the influence of temperature change, with means associated therewith to proportion the rate of heating and the rate of cooling of both strips.

Other objects and advantages of the invention will be apparent from the following description taken in conjunction with the drawing forming part of this specification, and in which.

Figure 1:
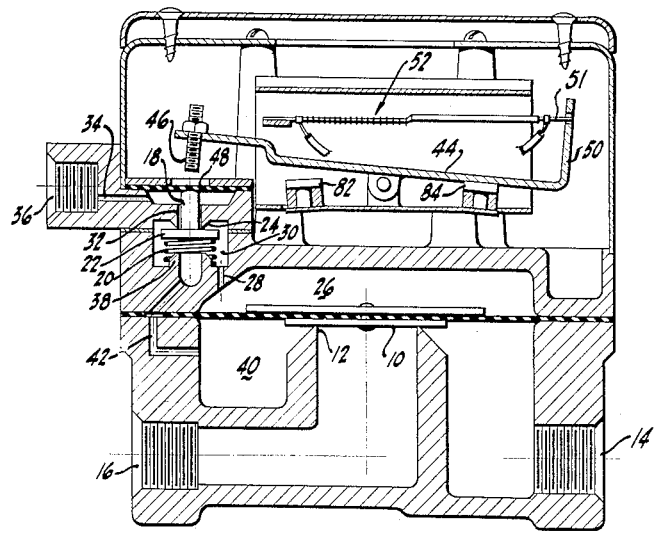
Figure 1 is a view in vertical section of a gas furnace control valve of the diaphragm puff bleed type, with the heat motor of the invention being shown in control relation therewith.

The gas valve of Figure 1 is conventional in form, and forms no part of the subject invention, being shown merely by way of example of an environmental structure with which the heat motor of the invention may be used. In passing, when the diaphragm valve element 10 is raised from seat 12, gas may pass from inlet 14 to outlet 16. Diaphragm valve element 10 is raised when the pressures above and below the diaphragm are unbalanced, with this unbalancing taking place when valve stem 18 is moved downwardly against the action of spring 20 to unseat valve disk 22 from seat 24, thereby bleeding the upper diaphragm chamber 26 through passage 28, valve chamber 30, passage 32, and passage 34 to bleeder outlet 36, and to bring disk 22 into engagement with seat 38, thereby interrupting communication between lower diaphragm chamber 40 and the upper chamber 26, which communication had theretofore existed through passage 42, chamber 30 and passage 28.

The stem 18 is moved downwardly when lever 44 is rocked in a counterclockwise direction to cause stud 46 carried thereby to move sealing diaphragm 48 downwardly, thereby effeting downward movement of stem 18. Lever 44 is provided with arm 50 which has a two-way connection 51 with the heat motor, indicated generally at 52, of the invention.

The heat motor comprises a bimetal strip 54 having one end thereof secured, as by bolts 56 to a support member 58, and a similar bimetal strip 60 rigidly secured, as by welding, to the free end of strip 54. Strip 60 is inverted with respect to strip 54.

The strips 54 and 60 are enclosed within a sheet 62 of electrical insulator material, such as a wrapper of plastic which has an insignificant effect as far as hindering the warping effect of the strips is concerned. Electrical circuit means, including a transformer 64, a thermostat control 66, and a continuous resistance winding 68 embracing the bimetal strips and interconnecting electrical contacts 70 and 72, are provided to heat the bimetal strips. It is to be particularly noted that strip 54 is provided with more turns of the resistance heating element 68 than strip 60. It is also to be particularly noted that bimetal strip 60 is further provided with a heat insulation sheet 74 which may be of the same material as the electrical insulator sheet 62. Means are thus provided to proportion the rate of heating of the two bimetal strips, and to proportion the rate of cooling of the two strips when circuit 64 is de-energized upon the opening of the switch element of the thermostat control 66. The reversed relationship of strips 54 and 60, and the provision of means for proportioning the heat input to and the heat output from the two strips enables the attainment of the essential object of the invention, i. e., the provision of a two-way rapid acting heat motor.

Figure 4:
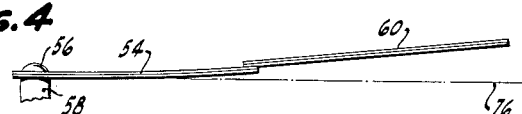
Figures 4, 5 and 6 are semi-schematic views in side elevation of the heat motor, showing sequential operating positions of the same.

When the circuit 64 is energized under the control of thermostat element 66, both of the strips 54 and 60 are heated, thus tending to warp the outer end of strip 54 upwardly and warp the outer end of strip 60 downwardly. However, since there is a greater heat input to strip 54 than to strip 60, the compound strip rapidly assumes the attitude indicated in Figure 4, wherein the free end of strip 60, constituting the lever-operating end of the compound strip is disposed above the horizontal, or neutral position, reference line 76. The lever 44 is thus rapidly rocked in a counterclockwise direction to cause the diaphragm valve 10 to be moved to an open position.

Figure 5:
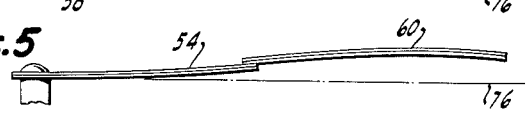

As the valve remains open and the heat input to the strips 54 and 60 continues, the strips become reversely warped to substantially the same degree, as shown in Figure 5, but the overall position of the compound strip is an upwardly warped position in which the lever 44 is maintained in a valve-open position.

Figure 3:
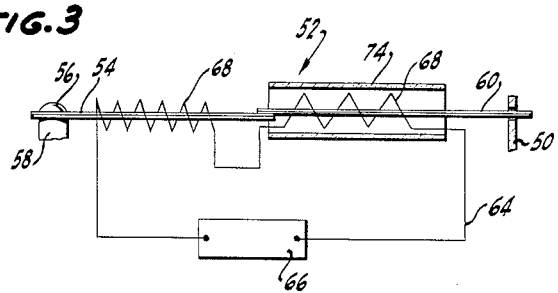
Figure 3 is a semi-schematic view in side elevation of the heat motor.
Figure 2:
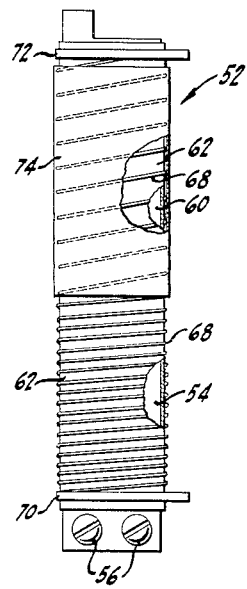
Figure 2 is an enlarged plan view of the heat motor of the invention.
Figure 6:
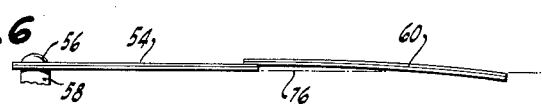

When a sufficient amount of fuel has been burned in the furnace to bring the room temperature to the level called for by the setting of the thermostat control element 66, the circuit 64 is de-energized, and the strips 54 and 60 begin to cool, thus tending to warp strip 54 downwardly and warp strip 60 upwardly. However, due to the heat insulation sheet 74, strip 60 cools at a slower rate than strip 54, the result being that there is an overall rapid movement of the compound strip downwardly to the position shown in Figure 6, such movement being effective to rock lever 44 in a clockwise direction to cause the diaphragm valve 10 to close. As strip 50 continues to cool it eventually reaches the neutral, or horizontal, position shown in Figure 3, such delayed warping of strip 60 being insufficient to reverse the position of lever 44.

Figure 7:
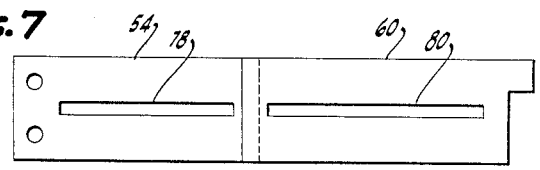
Figure 7 is a plan view of the bimetal elements of the heat motor in stripped condition.

As shown in Figure 7, the strips 54 and 60 are provided with longitudinal slots 78 and 80 adapted to minimize transverse warping or curling of the strips, which action would, in the absence of these slots or their equivalent, materially reduce the rate of movement of the compound strip in both the upward and downward direction. When, for example, the bimetal strips are 0.015 inch in thickness, this slotting increases the rate of vertical movement of the compound strip by approximately 20%.

In order to convert the rapid upward and downward movement of the compound strip to a two-way snap action movement as far as the lever 44 and stud 46 are concerned, permanent magnets 82 and 84 are positioned in underlying relation to the lever 44. As the compound strip moves upwardly to move the free end of lever 44 downwardly to a valve-opening position, the lever is snapped downwardly as it comes under the influence of magnet 82. Conversely, the free end of the lever is snapped upwardly to a valve-closing position as the compound strip moves the lever to a position where it is influenced by magnet 84.

While a specific embodiment of the invention has been shown and described, it is to be understood that all substantial equivalents of said embodiment are within the spirit and scope of the invention. For example it is within the spirit and scope of the invention to provide the bimetal strips with entirely separate heating means in conjunction with control means to heat first one strip and then the other, thereby adapting the heat motor for the control of a two stage valve.

What is claimed is:

A heat motor comprising a first normally flat bimetal strip, means positionally anchoring one end thereof, a second normally flat bimetal strip secured to the outer end of said first strip in inverted relation to said first strip and being thereby adapted to warp in a direction opposite to that of said first strip under the influence of heat, electrical means for heating said strips including a resistance winding wrapped around said strips, said first strip having a greater number of turns of said winding disposed thereabout than said second strip, whereby said first strip may be heated more rapidly than said second strip, electrical insulation means disposed between said winding and said strips, and heat insulation means disposed in embracing relation to said second strip and the turns of said winding disposed thereabout, whereby said second strip may cool more slowly than said first strip upon de-energization of said electrical means.

References Cited in the file of this patent

UNITED STATES PATENTS

| | | |
|---|---|---|
| 1,731,420 | Jackson | Oct. 15, 1929 |
| 2,125,858 | Hood et al. | Aug. 2, 1938 |
| 2,128,869 | Winborne | Aug. 30, 1938 |
| 2,129,937 | Johnson | Sept. 13, 1938 |
| 2,179,811 | Brosseau | Nov. 14, 1939 |
| 2,216,809 | Derby | Oct. 8, 1940 |
| 2,306,810 | Jones | Dec. 29, 1942 |
| 2,368,289 | Coxon | Jan. 30, 1945 |
| 2,687,005 | Ingersoll | Aug. 24, 1954 |